INVENTOR
ROBERT W. BOSSE
BY
ATTORNEY

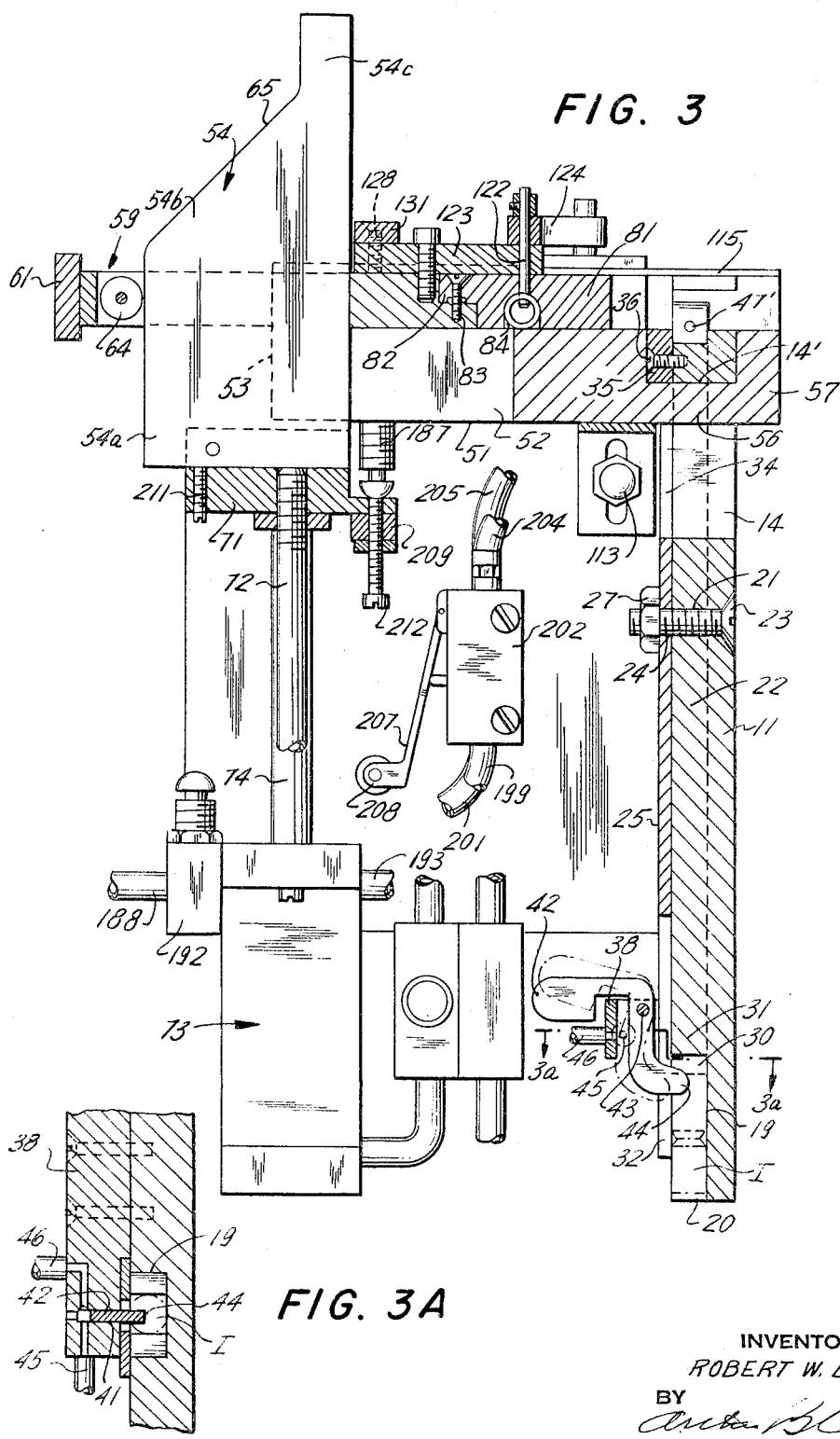

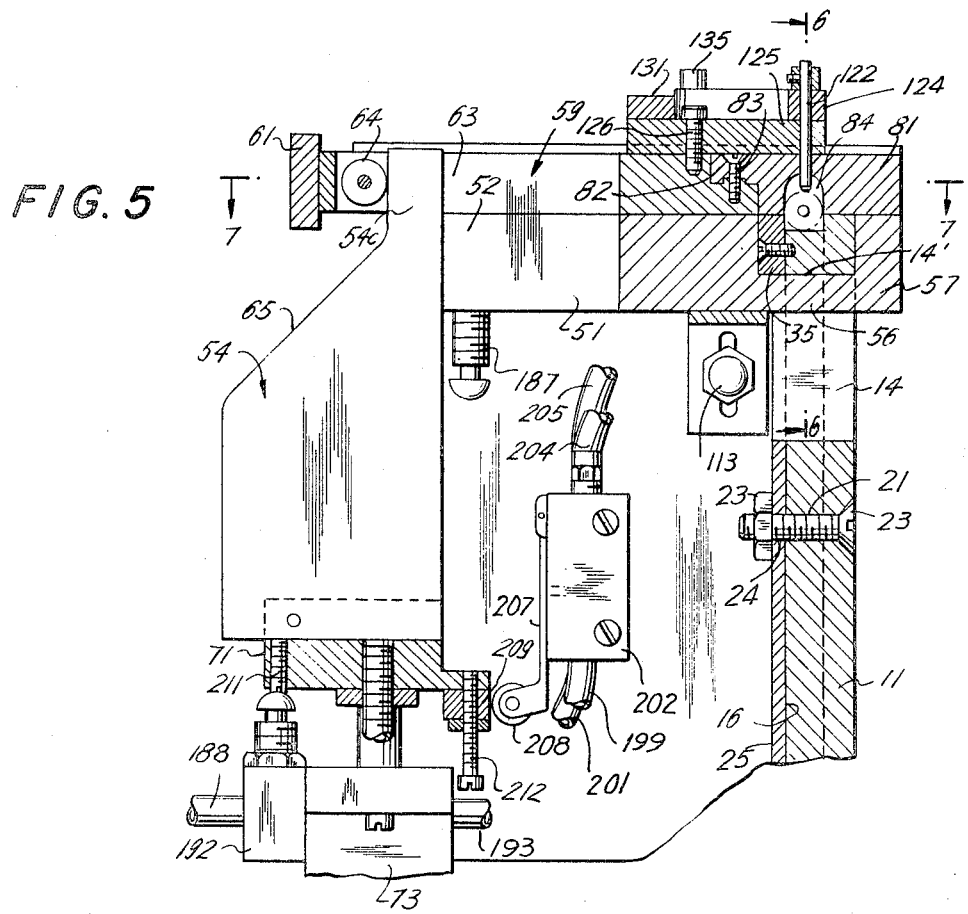
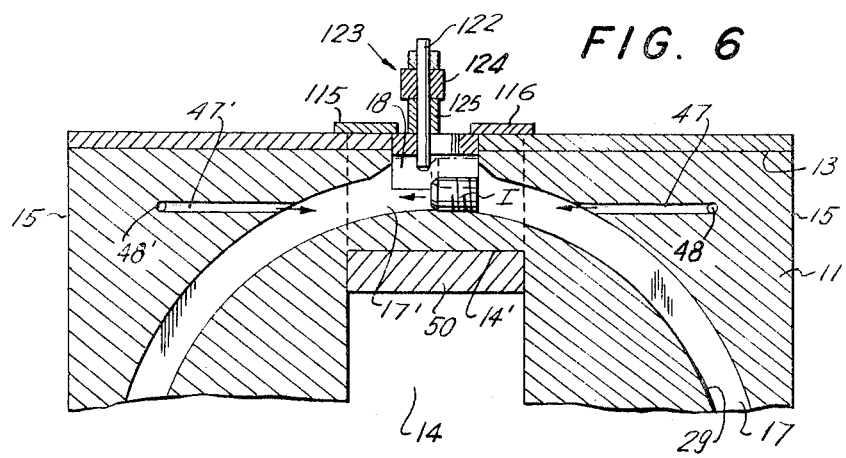

March 21, 1967  R. W. BOSSE  3,310,153
INSERT ORIENTING EQUIPMENT
Filed Sept. 8, 1965  6 Sheets-Sheet 5
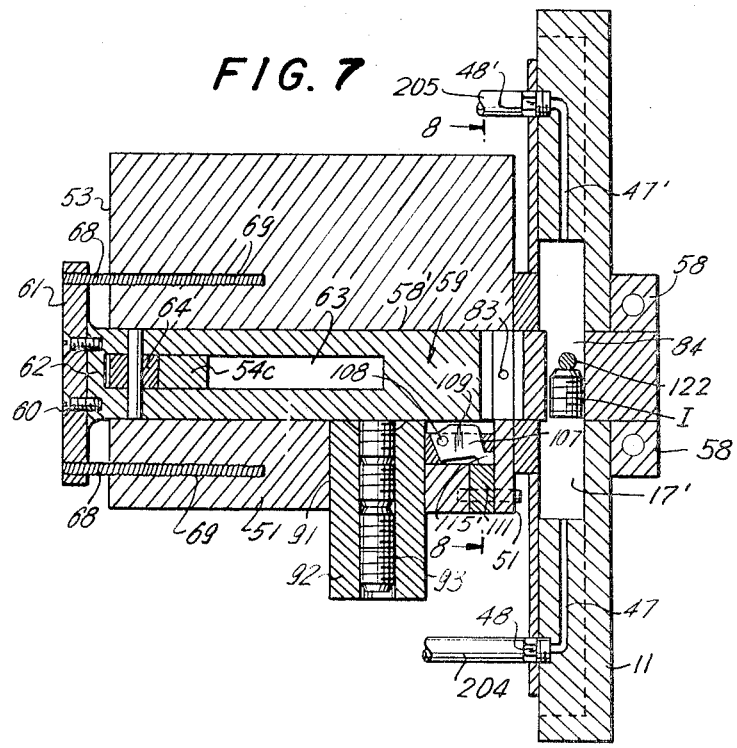
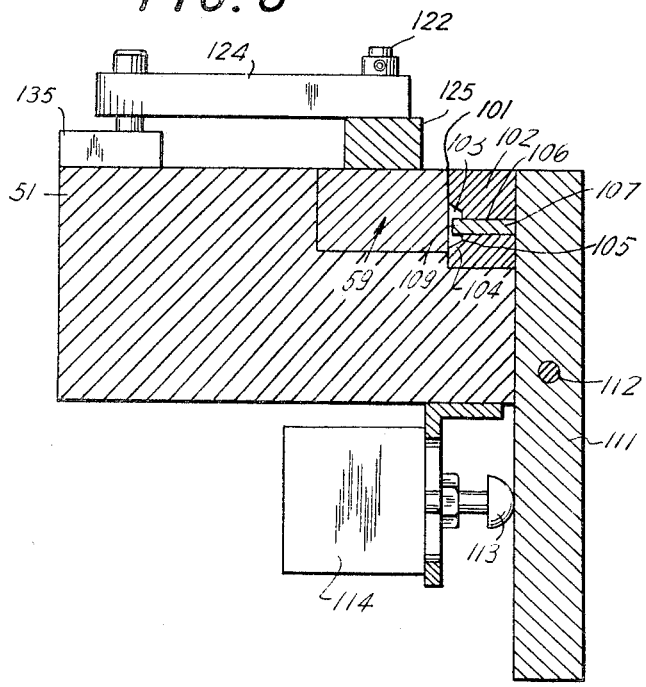
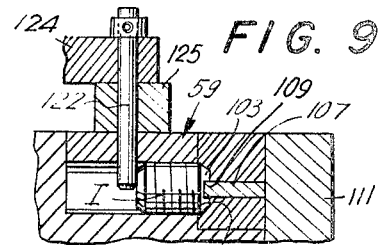
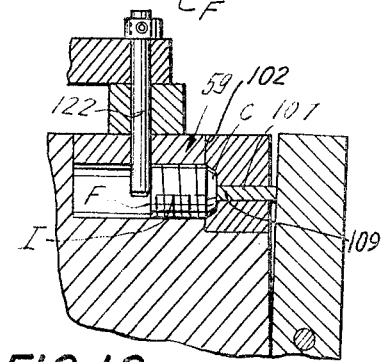
INVENTOR
ROBERT W. BOSSE
BY
*Arthur B Colvin*
ATTORNEY

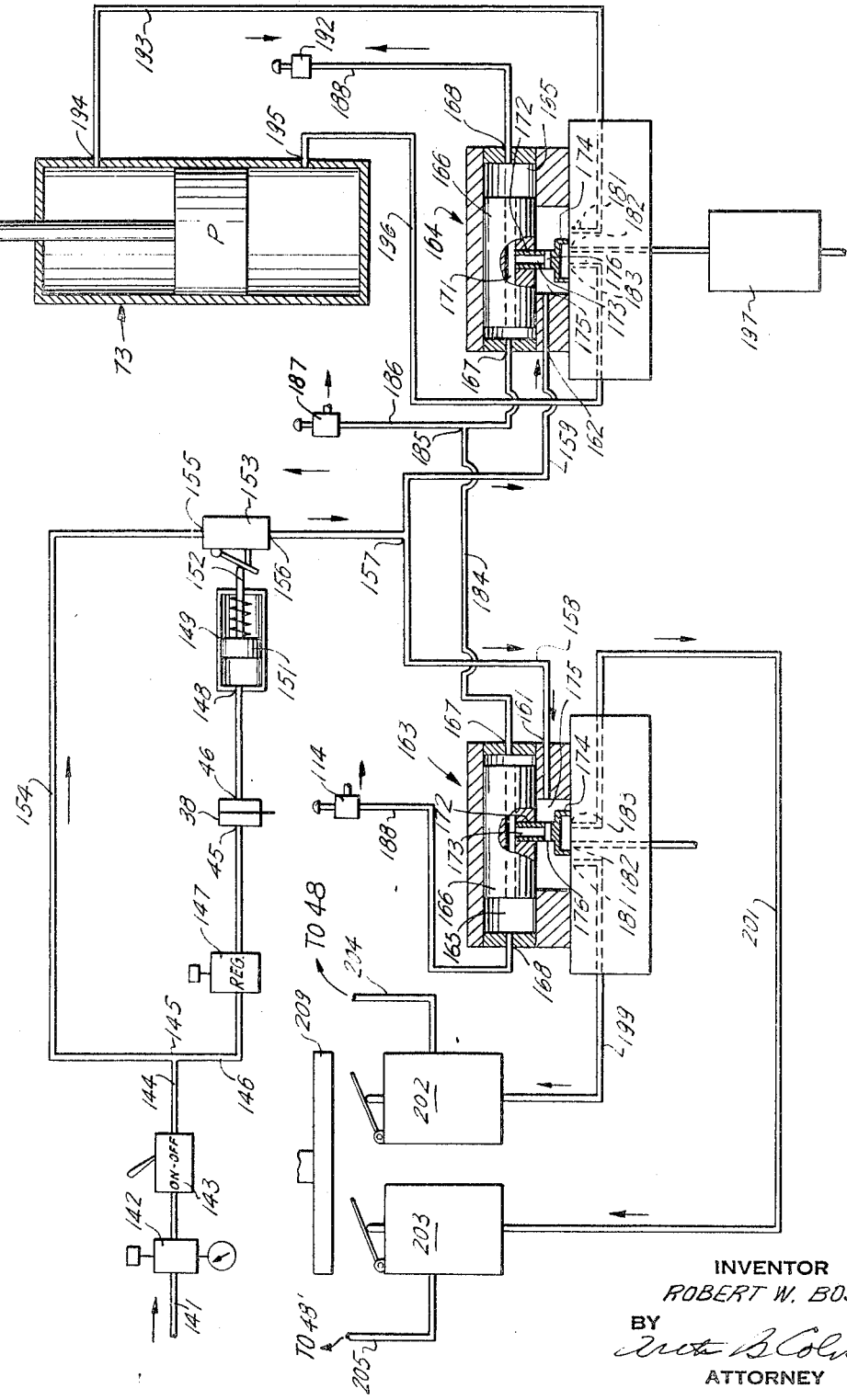

United States Patent Office 3,310,153
Patented Mar. 21, 1967

3,310,153
INSERT ORIENTING EQUIPMENT
Robert W. Bosse, Englewood Cliffs, N.J., assignor to Groov-Pin Corporation, Ridgefield, N.J., a corporation of New York
Filed Sept. 8, 1965, Ser. No. 485,694
11 Claims. (Cl. 198—33)

This invention relates to equipment for properly orienting inserts of the type that have a chamfered outer periphery at one end to act as a pilot or lead end.

As conducive to an understanding of the invention, it is noted that where inserts of the above type must be visually inspected by an operator and oriented so that each has its chamfered portion in the same relative position for presentation to a drilling equipment, for example, of the type shown and described in Patent No. 2,913,933, that forms holes in the chamfered portion of the insert to effect a self-tapping action when the insert is used, such operation is slow and time consuming.

Furthermore, when a finished insert must be visually inspected by the operator and oriented so that each has its chamfered portion in the same relative position for insertion into a bored hole into which the insert is to be positioned, the operation is also slow and time consuming. In addition to the time involved for this operation, the likelihood of human error is great, especially after the operator has handled a large number of inserts, due to the resultant fatigue.

It is accordingly among the objects of the invention to provide an equipment that has but few parts and is not likely to become deranged even after long use, and which will automatically and dependably, and with no need for supervision, and at a relatively high rate of speed, properly orient inserts with the chamfered portion thereof in the same relative position with respect to the length of the insert so that subsequent operations may be properly performed.

According to the invention, these objects are accomplished by the arrangement and combination of elements hereinafter described and more particularly recited in the claims.

Figure 1:
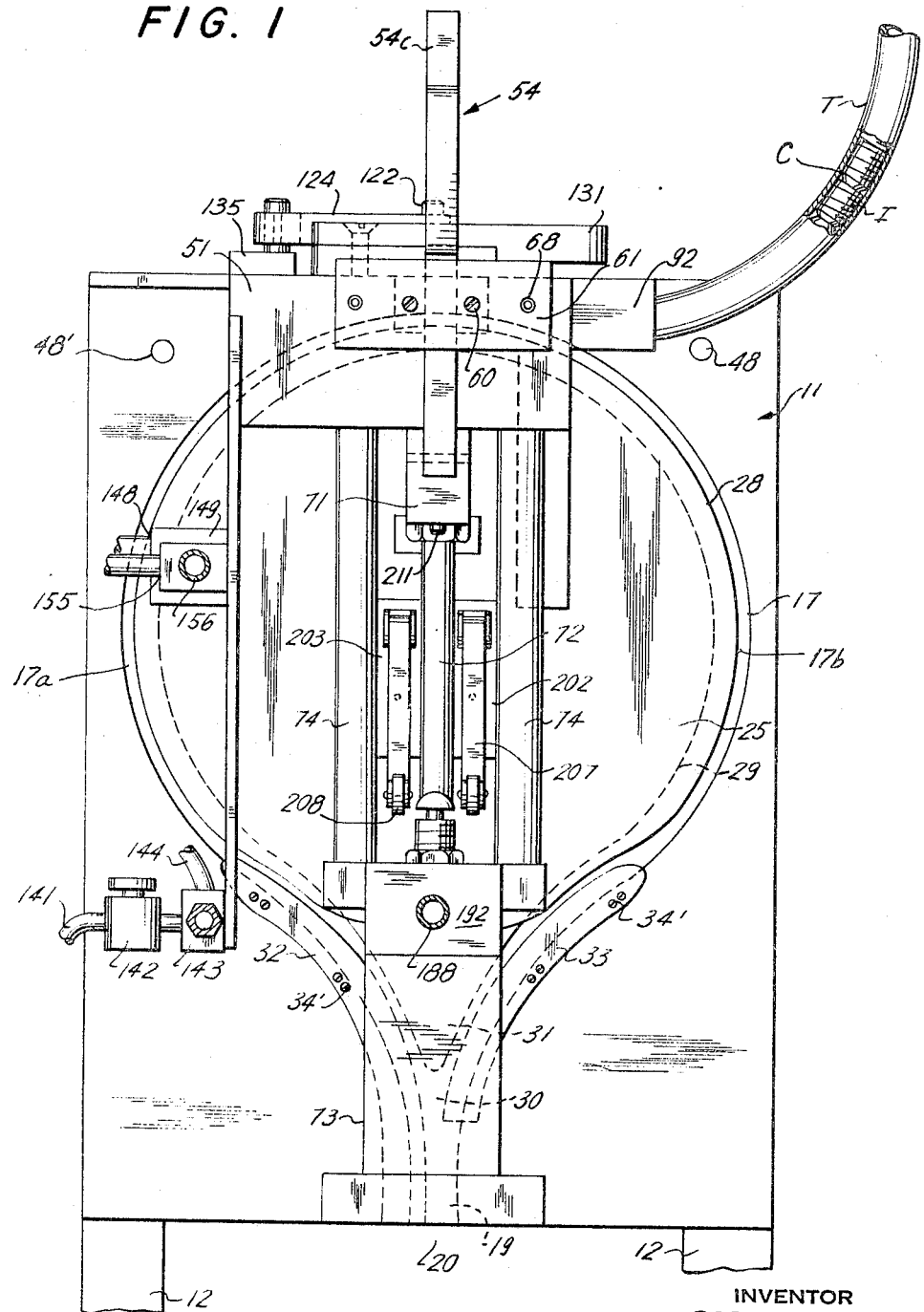
Figure 2:
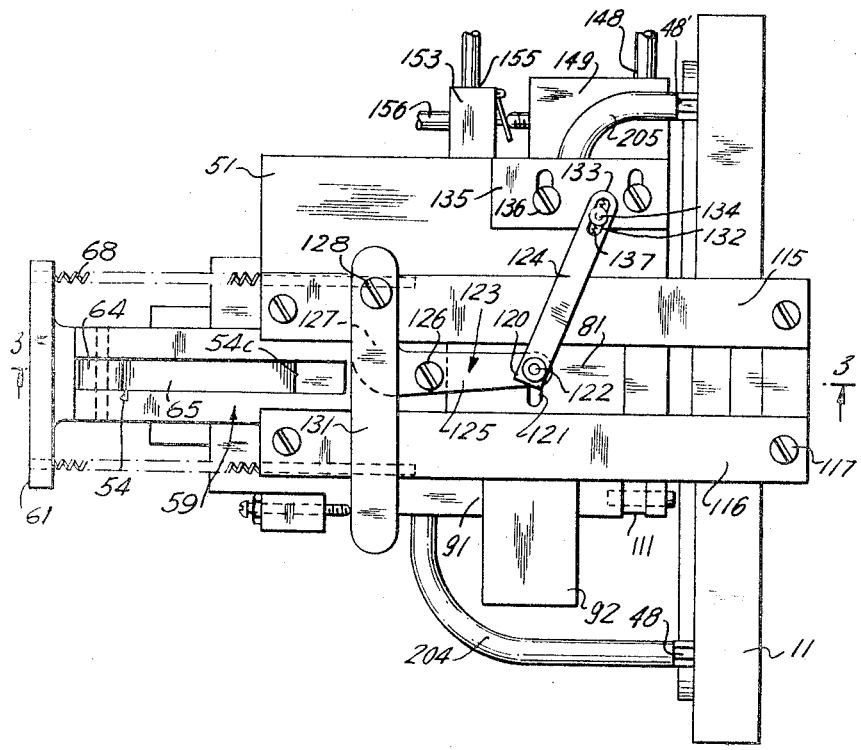

In the accompanying drawings in which are shown one of various possible embodiments of the several features of the invention, FIG. 1 is a front elevational view of the insert orienting equipment, FIG. 2 is a top plan view of the equipment in insert loading position, FIG. 3 is a sectional view taken along line 3—3 of FIG. 2, FIG. 3a is a detail sectional view taken along line 3a—3a of FIG. 3.

Figure 4:
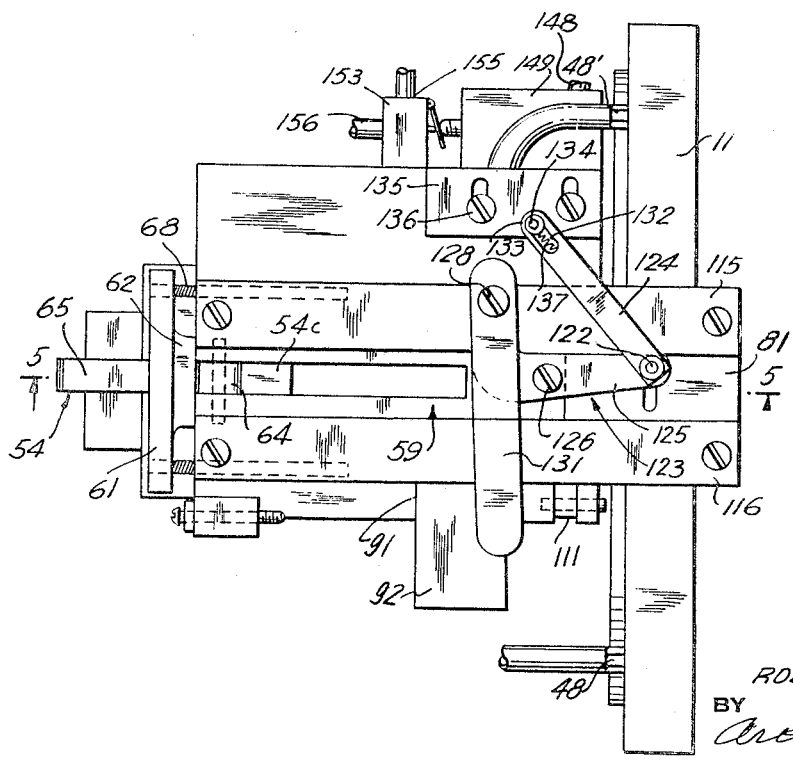

FIG. 4 is a view similar to FIG. 2 of the equipment in insert orienting position, FIG. 5 is a sectional view taken along line 5—5 of FIG. 4, FIG. 6 is a sectional view taken along line 6—6 of FIG. 5, FIG. 7 is a sectional view taken along line 7—7 of FIG. 5, FIG. 8 is a sectional view taken along line 8—8 of FIG. 7, FIGS. 9 and 10 are fragmentary detail views illustrating the operation of the sensing block, and FIG. 11 is a circuit diagram of the automatic control means for the equipment.

Referring now to the drawings, as shown in FIG. 1, the orienting equipment comprises a substantially rectangular base plate 11, supported in upright position by suitable vertical standards or posts 12.

As shown in FIGS. 5 and 6, the base plate 11 near its upper edge 13 has a substantially rectangular opening 14 therethrough midway between the side edges 15 thereof.

The front surface 16 of the plate 11 has a substantially annular recess 17 therein, the top portion 17' of which is in communication with a rectangular central notch 18 in the upper edge 13 of the base plate 11. The lower portion of the recess 17 is in communication with a vertical recess 19, the lower end of which defines the discharge outlet 20 of the equipment. Thus, the substantially annular opposed portions 17a, 17b of the annular recess 17 define conduits leading from the top portion 17' of recess 17 to vertical recess 19.

Extending through a central opening 21 in the hub 22 defined by the annular recess 17 is a bolt 23, which also extends through a central opening 24 (FIG. 3), in a disc 25 positioned on the front surface of hub 22, a nut 27 clamping said disc 25 in fixed position.

The periphery 28 (FIG. 1) of disc 25 extends beyond the inner edge 29 of the annular recess 17 to cover the latter and to retain the insert I therein when the equipment is operating.

As is clearly shown in FIG. 1, the lower portion of the hub 22 tapers substantially to a point to define a triangular portion 31 at the inlet 30 to the vertical recess 19. Secured to the front surface of the plate 11 adjacent the lower portion of the recess 17 are arcuate strips 32, 33 which are secured in place as by screws 34' and which also cover a portion of the recesses 17, 19.

The upper portion of disc 25 has a rectangular opening 34 aligned with opneing 14 in plate 11 and a U-shaped bracket 35 is secured by screws 36 to the front of the plate 11 over the rectangular opening 14 thereof.

Secured to the plate 11 near its lower edge is an elongated block 38. As shown in FIGS. 3 and 3a, the block 38 extends transversely across the vertical recess 19 and has a slit 41 in which a substantially U-shaped plate 42 is pivotally mounted as at 43.

The plate 42 has a finger 44 extending into the vertical recess 19 in the path of movement of an insert I falling therethrough and a pressure inlet port 45 leads into slit 41 and a pressure outlet port 46 extends from said slit.

Thus, when an insert moves freely past finger 44, it will pivot the L-plate 42 is a clockwise direction, referring to FIG. 3, to cut off communication between ports 45, 46 and if no insert is in the path of the finger 44, the ports 45, 46 are in communication and inserts will continue to be fed into the recess 19. If the vertical recess 19 fills up, the plate 42 will be pivoted to cut off communication between ports 45, 46. Momentary cut off of said ports by reason of successive discharge of inserts through vertical recess 19 will not affect the operation of the equipment as will hereinafter be described.

Leading into the upper portion of the recess 17 (FIG. 6), are air passageways 47, 47' shown in FIG. 7 which have pressure inlet ports 48, 48' connected thereto so that the insert I, in the upper portion 17' of the recess 17, may be blown in a clockwise or counterclockwise direction (FIG. 6).

The actuating mechanism of the equipment is supported from a block 51 which is substantially rectangular as shown in FIG. 3, for example, and has a vertical slit 52 in its front end 53 through which rides a cam plate 54. The rear of block 54 has an outwardly extending leg 56 with an upwardly extending finger 57 at its free end which is bifurcated as at 58.

The leg 56 extends through the opening 14 in the plate 11 and is pushed upwardly so that its top surface rests against the lower surface of the upper edge of rectangular opening 14 as at 14'.

The block 51 has a slot 58 in its top surface extending from the front to the rear edge thereof in which the main actuating bar 59 is slidably mounted.

The bar 59 which is an elongated substantially rectangular block, has an end plate 61 secured to the outer end 62 thereof by screws 60 and extending transversely thereacross, and an elongated slot 63 extends from the outer end 62 of the bar toward the front end thereof. As is shown in FIG. 7, a roller 64 is rotatably mounted at the outer end of slot 63 and reacts against the cam surface 65 of cam 54.

As is clearly shown in FIG. 7, a pair of coil springs 68 are secured at one end to the ends of end plate 61 and have their other ends secured in bores 69 in block 51 normally to urge the actuating bar inwardly or to the right referring to FIG. 7.

As shown in FIG. 3, the cam plate 54 has a substantially rectangular lower portion 54a, an inclined cam surface 54b and a vertical cam surface 54c.

The lower edge of cam plate 54 has a block 71 secured thereto and one end of a piston rod 72 is secured to the undersurface of the block 71. The piston rod extends into an actuating cylinder 73 preferably of the air actuated type which is rigidly supported by posts 74 secured to and depending from the block 51 as is clearly shown in FIG. 1.

Thus, upon actuation of the air cylinder to reciprocate the piston rod 72 thereof, the cam plate 54 will be reciprocated so that its cam surface 65 will reciprocate the actuating bar 59 in its slot 58.

Secured to the free end of the actuating bar 59 is a transfer block 81 which has a lip 82 at one end through which extends a screw 83 to secure the block 81 to bar 59 (FIG. 3).

The block 81 on its undersurface has an arcuate transverse slot 84 into which an insert I may be inserted to be moved into alignment with the inlet 18 to the arcuate recess 17.

The block 51 has a cavity 91 in one side of its top surface as shown in FIG. 7 to accommodate a feed block 92 which has a bore 93 through which the inserts are advanced by gravity from a suitable feed tube T (FIG. 1) to be moved into the arcuate transfer slot 84 when the latter is in alignment with bore 93, said block 92 defining a feeding station.

Positioned in a cavity 101 in the top surface of block 51 is a sensing block 102 which defines the sensing station. The block 102 has a groove 103 therein with outwardly beveled side walls 104 and a flat floor 105. The floor 105 has a slot 106 therethrough in which an actuating arm 107 is pivotally mounted as at 108.

As is clearly shown in FIGS. 7 and 8, a portion 109 of arm 107 is normally urged beyond the floor 105 of groove 103 by a lever 111 pivoted between its ends as at 112. One end of lever 111 abuts against the spring urged control member 113 of an air valve 114 which retains the other end of the lever against a finger 115' formed integral with arm 107 to retain the portion 109 thereof protruding from floor 105 to groove 103.

In order to retain the block 51 in fixed position, a pair of rigid strips 115, 116 is provided secured at their ends respectively by screws 117 to the top of the arms 57 and to the block 51 as is shown in FIGS. 2 and 4.

The transfer block 81 has a vertical slot 121 (FIG. 2) extending transversely thereof and extending into the transverse slot 84. A pressure pin 122 extends through slot 121 into slot 84. The upper end of pin 122 extends through aligned openings in the juxtaposed ends 120 of arms 123, 124. As is shown in FIG. 2, the arm 123 is substantially L-shaped and has one leg 125 thereof pivoted as at 126 to the actuating bar 59, and the other leg 127 thereof is rigidly secured by screw 128 to one end of a lever arm 131 which extends substantially transversely across actuating bar 59.

The arm 124 has a slot 132 at the end 133 thereof remote from its end 120. A pin 134 extends through slot 132, being secured at its lower end in a block 135 adjustably secured by screws 136 to block 51. A pair of coil springs 137 are positioned in slot 132 on each side respectively of pin 134 resiliently to mount arm 124.

Suitable control means are provided to afford automatic operation of the equipment.

Thus a source of air under pressure is applied through line 141 (FIG. 11) to pressure regulator 142 and then through air valve 143 and line 144 to junction 145. From junction 145, the air under pressure flows through line 146 and pressure regulator 147 to port 45 of block 38 and from port 46 of said block to the inlet port 148 of an air actuator 149.

The actuator 149 has a spring returned piston 151 which mounts a piston rod 152 which reacts against the control member of an air valve 153. Thus, when pressure is applied to port 148 of actuator 149 the air valve will be in open position and air will flow from junction 145, line 154 to inlet 155 of valve 153 and from outlet 156 of valve 153 to junction 157.

The junction 157 is connected by lines 158, 159 to the inlet ports 161, 162 of control valves 163, 164.

As shown in FIG. 11, the valves 163, 164 are identical and each comprises a body portion having a bore 165 in which a piston 166 is slidably mounted. Each of the ends of the body portion has a port 167, 168 in communication with the bore 165 on each side of the piston therein.

The piston 166 has an axial bore 171 extending therethrough with a radial bore 172 leading thereinto. A hollow stud 173 is positioned in bore 172 and mounts a hollow cup 174 at its lower end slidable in a cavity 175 at the bottom of the body portion of each valve. The stud 172 has a transverse bore 176 therethrough leading into cavity 175 to provide communication between cavity 175 and the bore 171 of piston 166, the ports 161, 162 being in communication with the cavities 175 of valves 163, 164.

The body portion of each valve has three ports 181, 182 and 183 leading into each cavity 175, the slide cup 174 connecting two of said ports in each extreme position thereof.

As shown in FIG. 11, the ports 167 of the valves 163, 164 are connected by line 184 to junction 185 and then by line 186 to normally closed bleeder valve 187. The ports 168 of each valve 163, 164 are connected by lines 188 to associated bleeder valves 114, 192.

The port 181 of the valve 164 is connected by line 193 to port 194 of air actuator 73 on one side of the piston P thereof and the port 195 of actuator 73 on the other side of the piston P is connected by line 196 to port 183 of valve 164. The port 182 of valve 164 is connected through flow restrictor valve 197 to exhaust.

The port 182 of valve 163 is connected to exhaust and the ports 181, 183 of said valve 163 are connected respectively by lines 199, 201 to the inlet ports of air valves 202, 203, each having an outlet port connected to ejection ports 48, 48' respectively by lines 204, 205.

As is clearly shown in FIGS. 1, 3, 5 and 11, each of the valves 202, 203 is normally closed and has a control member 207 with a roller 208 at its free end adapted to be engaged by an abutment bar 209 carried by the block 71 at the lower end of cam plate 54.

As is shown in FIG. 5, the block 71 and bar 209 each carries an adjustment screw 211, 212 which reacts against the control member of the associated valve 192, 187 to determine the reciprocation of air actuator 73.

*Operation*

The tube T is connected to a suitable feeding device of any conventional type, which will continuously discharge the inserts I into the tube T into feed bore 93. However, as such inserts are fed into such tube at random, the chamfered portion C (FIGS. 1 and 10) may be at the upper or lower end thereof.

Assuming that the air valve 143 is turned on, then air under pressure will flow to port 45 of block 38 (FIGS. 3, 3a and 11). Since no insert has yet been discharged into outlet 19, the ports 45, 46 will be in communication and such air under pressure will enter port 148 and force piston rod 152 to the right to actuate valve 153 to open the latter. As a result, air under pressure will flow through valve 152 to ports 161, 162 of valves 163, 164.

Referring to valve 164, the air under pressure will enter cavity 175 and flow through port 181 and line 193 into port 194 of air actuator 73. At the same time, such air will flow through bore 176 and stud 172 into the bore 171 of piston 166 to react against both ends thereof. As the pressure against both ends of piston 166 is equal, the latter will not move.

At this time the air under pressure entering port 194 will move the piston P of actuator 73 downwardly, the air beneath the piston escaping through port 195 and line 196 into port 183 and through port 182 and flow restrictor 197 to exhaust. The speed of the downward movement of piston P may be determined by the setting of the flow restrictor 197.

As a result of the downward movement of piston P of actuator 73, the cam 54 will also move downwardly and hence the springs 68 will move actuating bar 59 inwardly or to the right, referring to FIG. 7.

When the piston P was in its uppermost position, the cam 54 would have retained the actuating bar 59 in its outermost position as shown in FIG. 2 at which time the recess 84 in bar 59 will be aligned with the bore 93 of feed block 92.

Referring to FIG. 7, the inserts I will be fed by gravity to fill the bore 93 of the feed block and the innermost insert I will have been forced into said recess 84 abutting against the lower end of presser pin 122.

The inward movement of actuating bar 59 will cause the insert I in recess 84 to be moved to the right. As the actuating bar 59 moves to the right, referring to FIGS. 2 and 4, the arm 125 carried by bar 59 will react against arm 124 causing the latter to pivot in a counterclockwise direction from the position shown in FIG. 2 to the position shown in FIG. 4.

As arm 124 pivots, the pin 122 carried thereby will move in an arcuate path, i.e., it will initially move downward in slot 121 referring to FIG. 2. As a result, the pin 121 will press against the rear end of the insert I as is shown in FIG. 9, for example, the coil springs 137 resiliently urging the pin 122 against the insert I.

As the bar 59 is advanced it will move the insert from the feeding station defined by feed block 92, through the beveled groove 103 (FIGS. 8 and 9) which defines the sensing station.

Assuming that the flat end F of the insert I was adjacent the groove 103 as shown in FIG. 9, since the insert would not enter the groove 103 substantially, as its outer diameter is substantially equal to the widest position of said groove, it would move along the length of the latter without engaging the portion 109 of arm 107 and hence the lever 111 would not be pivoted. As a result, the bleeder valve 114 (FIGS. 8 and 11) would remain closed.

Referring to FIG. 11, the air under pressure applied to port 161 of valve 163 would flow into cavity 175 of said valve and through port 181 and line 199 into the inlet of closed valve 202. In addition, such air would flow through the bore 176 and stud 172 of valve 163 and through bore 171 of the piston thereof. However, as the valves 114 and 187 are closed, the pressure on both ends of the piston of valve 163 would be equalized and the piston would not move. By reason of the position of such piston, ports 182, 183 of valve 163 would be connected so that line 201 from valve 203 would be connected to exhaust.

With continued movement of actuating bar 59, the insert I would be moved from the sensing station to the discharge station at 17' as shown in FIGS. 5, 6 and 7.

As shown in FIGS. 5 and 6, the insert when at the discharge station would drop downwardly onto the central portion of the arcuate recess 17 clear of pin 122.

At this time, the piston rod of actuator 73 would have reached the bottom of its stroke so that screw 211 (FIG. 3) would open valve 192 and bar 209 would have opened both valves 202, 203.

As a result of the opening of valve 202, air under pressure would be forced through line 204 into port 48 and through passageway 47 to react against the insert I to blow it to the left, referring to FIG. 6. This will cause the insert to drop through the arcuate recess 17 and drop by gravity through vertical recess 19 to be discharged from the equipment with the chamfered portion of the insert directed downwardly. As discharge port 48' is connected through open valve 203 and ports 182, 183 of valve 163 to exhaust, no air under pressure will flow into bore 48'.

As the insert falls through vertical recess 19 it will pivot arm 42 momentarily to cut off ports 45, 46. However, referring to FIG. 11, by reason of the dashpot action resulting from the relatively tight fit of piston 151 in actuator 149, it will move slowly and before valve 153 can close, the ports 45, 46 will again be connected to retain valve 153 in open position.

The opening of valve 192 at the bottom of the stroke of the air actuator 73 will cause the pressure in the bore of valve 164 on the right side of the piston 166 thereof to drop, so that the piston will move to the right.

As a result, ports 182, 181 will be connected and port 183 connected to port 195 of actuator 73 will be connected to pressure port 162.

When ports 182, 181 are connected, the pressure in actuator 73 above the piston P thereof will be discharged through flow restrictor 197 to atmosphere. The connection of ports 183, 162 will permit flow of air under pressure into the actuator 73 beneath the piston, to lift the latter.

As a result, the cam 54 will be moved upwardly and valves 192, 202 and 203 will close.

As the cam moves upwardly, it will force the actuating bar 59 outwardly or to the left to move the recess 84 thereof back to the feeding station. When the piston P reaches the upper limit of its stroke, the valve 187 will be opened to reduce the pressure on the right side of piston 166 of valve 163 and the left side of the piston 166 of valve 164.

As a result, the piston 166 of valve 163 will remain on the right side and the piston 166 of valve 164 will move to the left. Consequently, the ports 182, 183 of valves 163, 164 respectively will be connected.

This will permit flow of air under pressure from port 162 of valve 164, port 181 thereof and line 193 into port 194 to again lower the piston P of actuator 73 to repeat the inward movement of actuating bar 59.

Assuming that the insert I, now being advanced by the actuating bar 49, is in the position shown in FIG. 10, the chamfered portion C of the insert will enter the groove 103 between the beveled walls 104 thereof and with advance of the insert I, the portion C will engage the pivoted member 107 (FIGS. 7, 10). As a result, the finger 115' thereof will abut against the upper end of lever 111 as shown in FIG. 10 to pivot such lever thereby opening valve 114.

Referring to FIG. 11, when valve 114 opens, the pressure on the right side of piston 166 of valve 163 will exceed that in the left side thereof to cause movement of the piston 166 to the left. As a result, the ports 181, 182 of valve 163 will be connected and the port 183 will be connected to pressure inlet 161. Thus, air under pressure will flow through line 201 into valve 203 and through line 205 to port 48' so that the insert I will be blown to the right and it will be discharged through the outlet 19 with its chamfered portion directed downwardly.

Thus, it is apparent that regardless of the orientation of the chamfered portion of the inserts, they all will be discharged through the outlet 19 with their chamfered portion directed downwardly.

The equipment above described will permit feeding of semi-finished inserts of the above type from an unassorted batch to a drilling equipment or of finished inserts to other equipment without need for any manual orienting operation, with attendant saving in the cost of fabrication of the finished products.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for orienting inserts of the type having a chamfered periphery at one end, said equipment comprising a feeding station, a sensing station and a discharge station, a transfer member to effect movement of an insert from said feeding station past said sensing station to said discharge station, means to reciprocate said transfer member, a discharge outlet, a pair of discharge conduits each in communication with said discharge station and said discharge outlet, said conduits each having an inlet, said inlets being on opposed sides of said discharge station, discharge means at said discharge station to effect movement of the insert at said station into one of said discharge conduits depending upon the orientation of the chamfered periphery of the insert when it is moved past said sensing station, said sensing station comprising a rigid member having a groove extending in a plane parallel to the direction of movement of the insert, said groove having opposed beveled walls and a floor, a movable sensing member protruding outwardly from said floor, the insert being of diameter such that it will engage the sensing member to move the latter only when the insert is oriented with such chamfered periphery moved between said beveled walls a predetermined amount, and means controlled by the movement of said sensing member, to actuate one of the discharge means at said discharge station, whereby the insert will be moved into the associated conduit for successive discharge of said inserts through said discharge outlet with the chamfered peripheries of said inserts having the same orientation.

2. The combination set forth in claim 1 in which means are provided to actuate the other of said means at the discharge station to move the insert through the other conduit only when the sensing member has not been actuated.

3. The combination set forth in claim 1 in which a presser pin is carried by said transfer member and reacts against one end of the insert to urge the other end into said groove as said insert is advanced.

4. The combination set forth in claim 1 in which said discharge means comprises a pair of opposed bores leading into said discharge station and means are provided selectively to apply a source of air under pressure to one of said bores when said insert is at said discharge station to effect movement of said insert into the associated conduit.

5. Equipment for orienting inserts of the type having a chamfered periphery at one end, said equipment comprising a feeding station, a sensing station and a discharge station, a transfer member to effect movement of an insert from said feeding station past said sensing station to said discharge station, an air actuator to control the movement of said transfer member, said actuator having a cylinder with a piston movable therein, said piston having a piston rod, means alternately to apply air under pressure to opposed sides of said piston to reciprocate said piston rod, a cam plate carried by said piston rod, said transfer member being operatively connected to said cam plate for reciprocation of said transfer member, a discharge outlet, a pair of discharge conduits each in communication with said discharge station and said discharge outlet, said conduits each having an inlet, said inlets being on opposed sides of said discharge station, discharge means at said discharge station to effect movement of the insert at said station into one of said discharge conduits depending upon the orientation of the chamfered periphery of the insert when it is moved past said sensing station, and means at said sensing station controlled by the orientation of said chamfered periphery of said insert to actuate one of the discharge means at said discharge station, whereby the insert will be moved into the associated conduit for successive discharge of said inserts through said discharge outlet with the chamfered peripheries of said inserts having the same orientation.

6. The combination set forth in claim 1 in which an air actuator controls the movement of said transfer member, said actuator having a cylinder with a piston movable therein, said piston having a piston rod operatively connected to said transfer member, means alternately to apply air under pressure to opposed sides of said piston to reciprocate said transfer member, said means comprising a two position valve, said valve comprising a cylinder having a piston slidable therein, said piston having an axial bore and a transverse bore leading into said axial bore, each of the ends of the cylinder having a port, a bleeder valve connected to each of said ports, means controlled by the movement of the piston rod of said air actuator to each of its extreme positions to actuate an associated bleeder valve, said two position valve having a chamber having an air inlet port, and two control ports and a control exhaust port leading thereinto, means connecting two of said control ports respectively to the air actuated cylinder on opposed sides of the piston thereof, means connecting the third control port to exhaust, and a slide valve carried by said valve piston adapted to connect one of said two control ports and said exhaust port in each position of said valve piston, whereby when air under pressure is applied to said air inlet, said slide valve will be reciprocated as said bleeder valves are alternately actuated.

7. Equipment for orienting inserts of the type having a chamfered periphery at one end, said equipment comprising a feeding station, a sensing station and a discharge station, a transfer member to effect movement of an insert from said feeding station past said sensing station to said discharge station, an air actuator to control the movement of said transfer member, said actuator having a cylinder with a piston movable therein, said piston having a piston rod operatively connected to said transfer member, means alternately to apply air under pressure to opposed sides of said piston to reciprocate said transfer member, a discharge outlet, a pair of discharge conduits each in communication with said discharge station and said discharge outlet, said conduits each having an inlet, said inlets being on opposed sides of said discharge station, discharge means at said discharge station to effect movement of the insert at said station into one of said discharge conduits depending upon the orientation of the chamfered periphery of the insert when it is moved past said sensing station, and means at said sensing station controlled by the orientation of said chamfered periphery of said insert to actuate one of the discharge means at said discharge station, whereby the insert will be moved into the associated conduit for successive discharge of said inserts through said discharge outlets with the chamfered peripheries of said inserts having the same orientation, and means at said discharge outlet to cut off flow of air under pressure to said air actuator when an insert remains in said discharge outlet beyond a predetermined time.

8. The combination set forth in claim 7 in the means at said discharge outlet to cut off flow of air under pressure to said air actuator when an insert remains in said discharge outlet beyond a predetermined time, comprises valve means controlling the flow of air under pressure to said air actuator, a control actuator comprising a cylinder having a piston slidable therein, said piston having a piston rod controlling said valve, resilient means normally urging said piston to retracted position to close said valve means, means to apply a source of air under pressure to said control actuator to react against the piston therein to open said valve, a pivoted substantially L-shaped plate having a pair of legs, one of said legs normally extending into said discharge outlet in the path of movement of the insert therethrough and the other leg being movable into the path of the air under pressure to said control actuator when said leg is engaged by said insert, momentarily to cut off flow of air to said control cylinder, said control cylinder providing a dashpot action to prevent retraction of said piston until the air has been cut off a predetermined time sufficiently to actuate said valve.

9. Equipment for orienting inserts of the type having a chamfered periphery at one end, said equipment comprising a feeding station, a sensing station and a discharge station, a transfer member to effect movement of an insert from said feeding station past said sensing station to said discharge station, means to reciprocate said transfer member; a discharge outlet, a pair of discharge conduits each in commnication with said discharge station and said discharge outlet, said conduits each having an inlet, said inlets being on opposed side of said discharge station, discharge means at said discharge station to effect movement of the insert at said station into one of said discharge conduits depending upon the orientation of the chamfered periphery of the insert when it is moved past said sensing station, said discharge means comprising a pair of opposed bores leading into said discharge station, a pair of normally closed valve means controlling flow of air under pressure to the bores respectively, means to open said valves, a control valve movable between two positions and adapted selectively to connect air under pressure to one of said pair of valves depending upon the position of such control valve, a pair of normally closed bleeder valves controlling said control valve and adapted when opened to actuate said control valve to an associated position, the means at the sensing station controlled by the orientation of the insert controls one of said bleeder valves and means when said transfer member is at said feeding station to actuate said other bleeder valve to effect movement of said control valve to the other position.

10. The combination set forth in claim 9 in which an air actuator controls the movement of said transfer member, said actuator having a cylinder with a piston movable therein, said piston having a piston rod operatively connected to said transfer member, means alternately to apply air under pressure to opposed sides of said piston to reciprocate said transfer member, means carried by the piston rod of said air actuator to open said pair of closed valve means in one extreme position of said piston rod.

11. The cmbination set forth in claim 9 in which an air actuator controls the movement of said transfer member, said actuator having a cylinder with a piston movable therein, said piston having a piston rod operatively connected to said transfer member, means alternately to apply air under pressure to opposed sides of said piston to reciprocate said transfer member, means carried by the piston rod of said air actuator to open said pair of closed valve means in one extreme position of said piston rod, and means carried by said piston rod in the other extreme position of said piston rod when said transfer member is at said feeding station to actuate said other bleeder valve.

References Cited by the Examiner
UNITED STATES PATENTS 3,015,413 1/1962 Hengel _____ 221—9
3,161,274 12/1964 Lanz _____ 193—43

EVON C. BLUNK, *Primary Examiner.*

RICHARD E. AEGERTER, *Examiner.*